United States Patent
Bae

(10) Patent No.: US 10,248,727 B2
(45) Date of Patent: Apr. 2, 2019

(54) SYSTEM FOR PROVIDING WORDS SEARCHING SERVICE BASED ON MESSAGE AND METHOD THEREOF

(71) Applicant: Young Hyun Bae, Incheon (KR)

(72) Inventor: Young Hyun Bae, Incheon (KR)

( * ) Notice: Subject to any disclaimer, the term of this patent is extended or adjusted under 35 U.S.C. 154(b) by 1023 days.

(21) Appl. No.: 14/400,595

(22) PCT Filed: Aug. 4, 2014

(86) PCT No.: PCT/KR2014/007167
§ 371 (c)(1),
(2) Date: Nov. 12, 2014

(87) PCT Pub. No.: WO2015/046742
PCT Pub. Date: Apr. 2, 2015

(65) Prior Publication Data
US 2015/0356185 A1    Dec. 10, 2015

(30) Foreign Application Priority Data

Sep. 25, 2013 (KR) .......................... 10-2013-0113605

(51) Int. Cl.
*G06F 17/30* (2006.01)
(52) U.S. Cl.
CPC .. *G06F 17/30867* (2013.01); *G06F 17/30268* (2013.01); *G06F 17/30657* (2013.01); *G06F 17/30663* (2013.01)
(58) Field of Classification Search
CPC ......... G06F 17/30268; G06F 17/30554; G06F 17/30572; G06F 17/30657; G06F 17/3061; G06F 17/30867; G06F 17/3089
See application file for complete search history.

(56) References Cited

U.S. PATENT DOCUMENTS 5,311,429 A * 5/1994 Tominaga ............. G06F 17/274 704/10
2007/0136243 A1 * 6/2007 Schorn ............. G06F 17/30613
(Continued)

FOREIGN PATENT DOCUMENTS

| JP | 10-232805 | 9/1998 |
| JP | 2003-186735 | 7/2003 |

(Continued)

OTHER PUBLICATIONS

Goldstein, Jade, et al. "Summarizing text documents: sentence selection and evaluation metrics." Proceedings of the 22nd annual international ACM SIGIR conference on Research and development in information retrieval. ACM, 1999.*

(Continued)

*Primary Examiner* — Nan Hutton
(74) *Attorney, Agent, or Firm* — Lex IP Meister, PLLC

(57) ABSTRACT

There are disclosed a system and method for providing a word search service based on message according to the present invention. The system for providing a word search service based on message according to the present invention includes a database which is equipped with a plurality of data modules and registers sentence data and word extracted from the sentence data in each data module equipped to manage the sentence data and the word; and a service server which, if receiving a search word from a user terminal, broadcasts the received search word to all data modules and is provided with a search result from each of all data modules in response to broadcasting and thereafter provides the provided search result to the user terminal.

2 Claims, 5 Drawing Sheets

(56) References Cited

U.S. PATENT DOCUMENTS

| | | | | |
|---|---|---|---|---|
| 2008/0298110 A1* | 12/2008 | Wickeraad | ............ | G11C 15/00 |
| | | | | 365/49.17 |
| 2010/0169343 A1* | 7/2010 | Kenedy | ............ | G06F 17/30867 |
| | | | | 707/758 |
| 2014/0358837 A1* | 12/2014 | Lehane | ............... | H04L 12/6418 |
| | | | | 706/48 |

FOREIGN PATENT DOCUMENTS

| KR | 10-2012-0095199 | 8/2012 |
|---|---|---|
| KR | 10-2012-0127876 | 11/2012 |

OTHER PUBLICATIONS

Matsuo, Yutaka, and Mitsuru Ishizuka. "Keyword extraction from a single document using word co-occurrence statistical information." International Journal on Artificial Intelligence Tools 13.01 (2004): 157-169.*

WIPO, International Search Report of PCT/KR2014/007167 dated Nov. 28, 2014.

* cited by examiner

[Fig. 1]
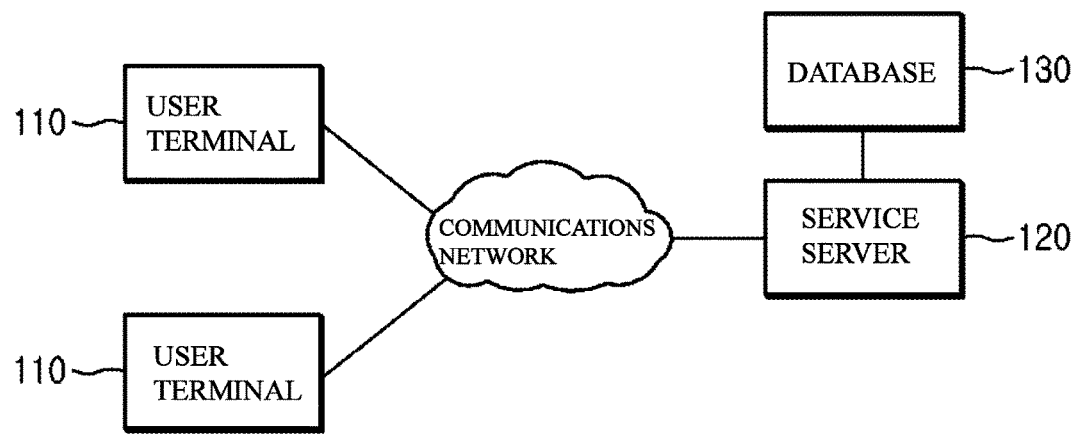

[Fig. 2]
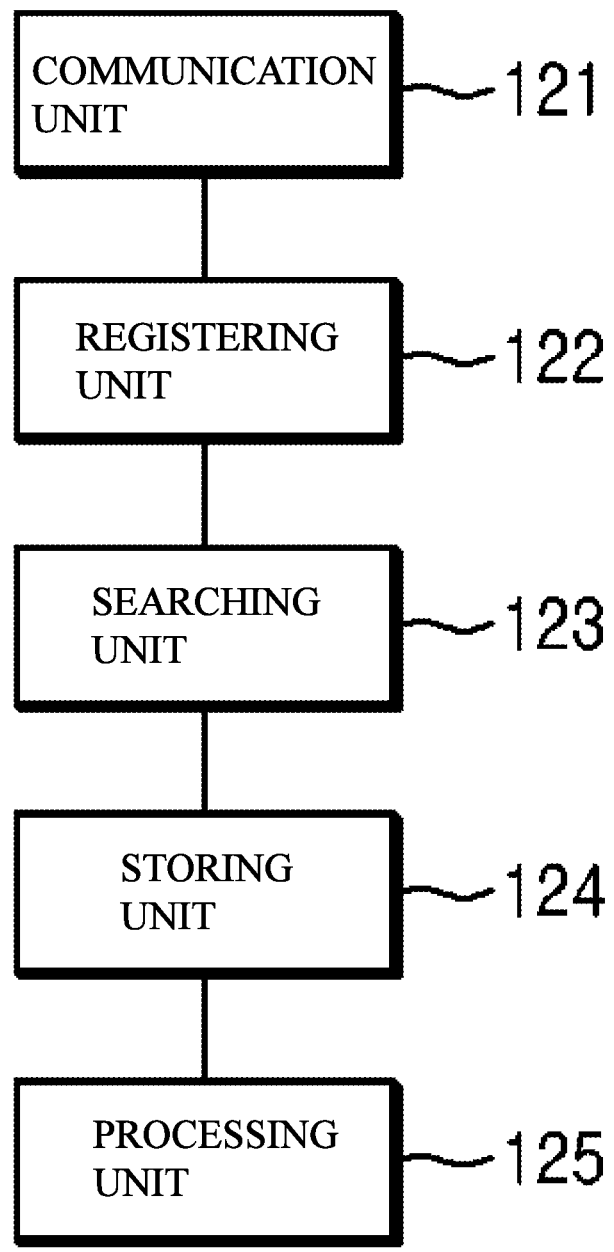

[Fig. 3]
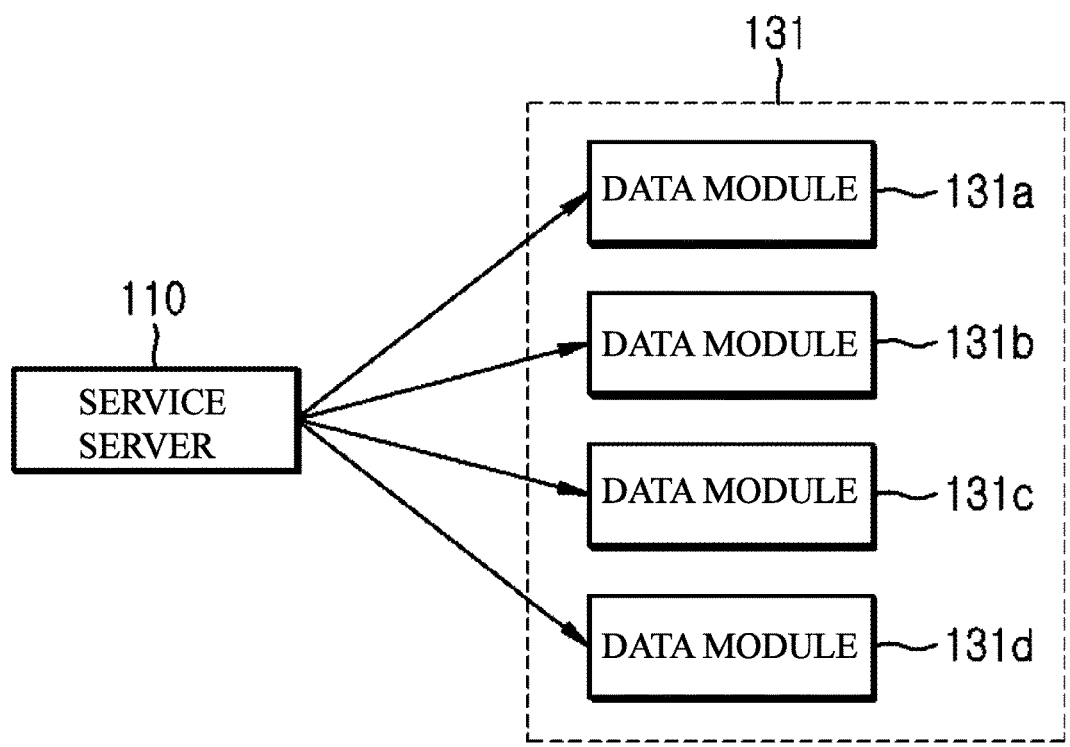

[Fig. 4]
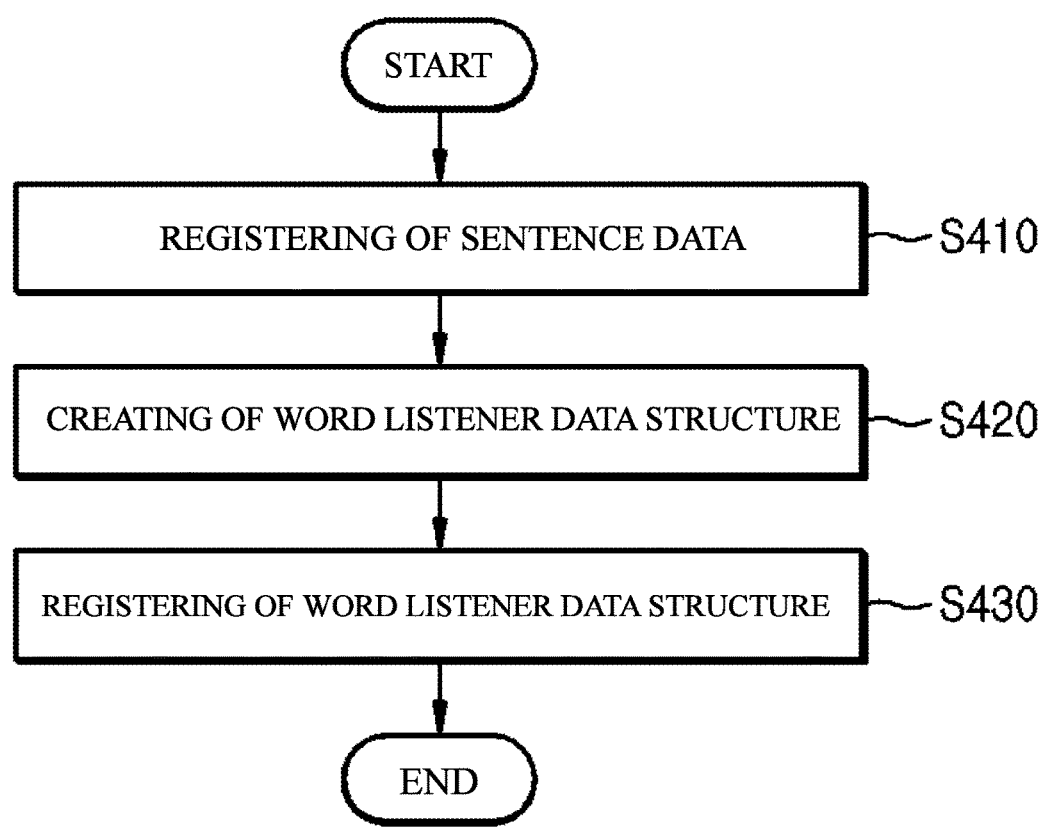

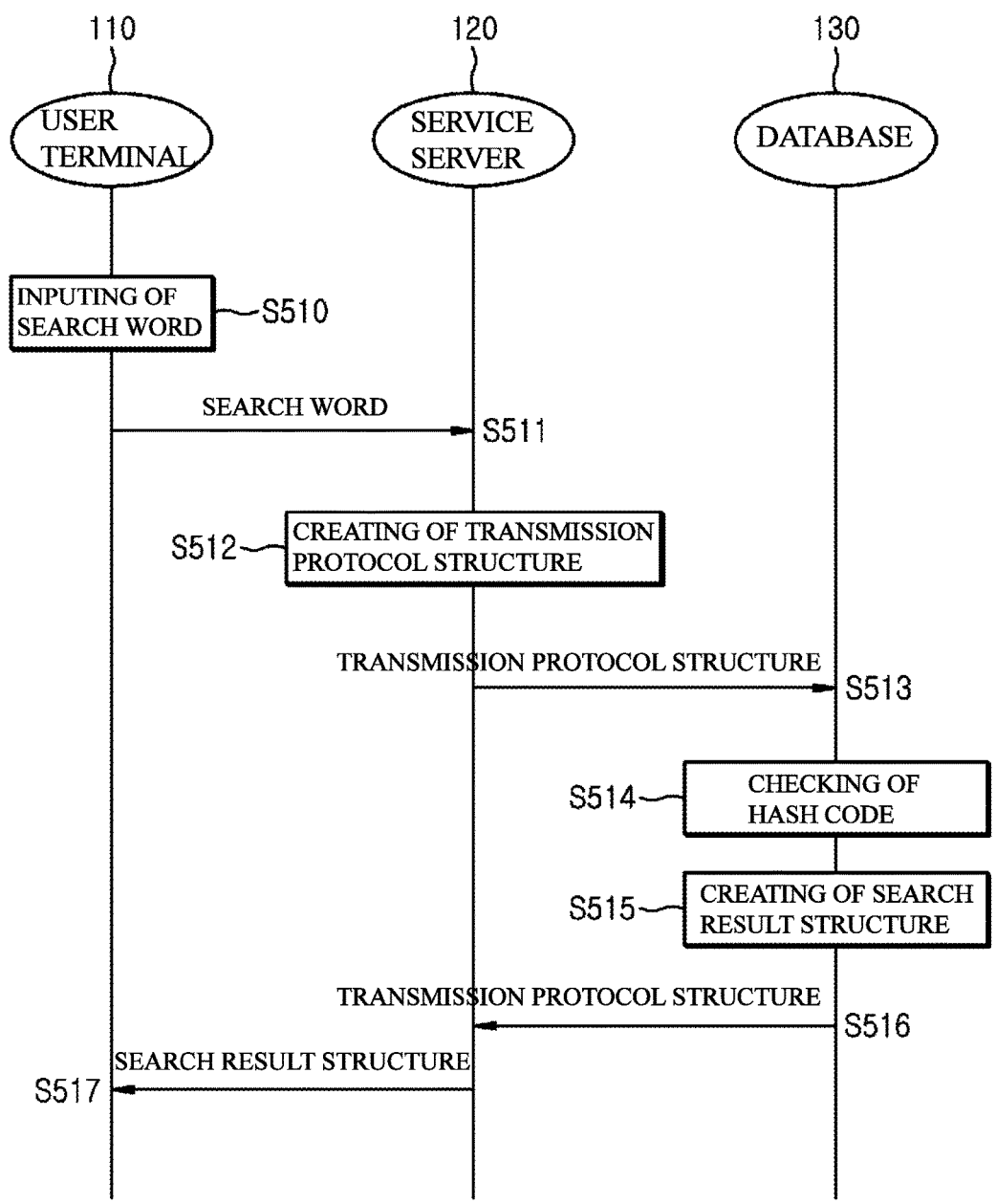
[Fig. 5]

SYSTEM FOR PROVIDING WORDS SEARCHING SERVICE BASED ON MESSAGE AND METHOD THEREOF

CROSS REFERENCE TO RELATED APPLICATIONS

This application is a National Stage of International Application No. PCT/KR2014/007167 filed Aug. 4, 2014, claiming priority based on Korean Patent Application No. 10-2013-0113605 filed Sep. 25, 2013, the contents of all of which are incorporated herein by reference in their entirety.

TECHNICAL FIELD

The present invention relates to a way for providing a word search service, and more particularly, a system and method for providing a word search service based on message wherein data module is assigned to each word extracted from registered sentence data and thereafter input search word is broadcast to all data modules, a search result is provided from each data module in response to broadcasting, and then a word search result is provided to a user based on the provided search result.

BACKGROUND ART

These days, the internet is widely spread, and as many pieces of information as called a sea of information are now provided through the internet. There are many cases where a search service is used when finding information desired by us among numerous pieces of information provided through the internet.

There are several search methods for providing such a search service. First, there is a method of sequentially searching words from the first to the last in existing database. In other words, even if the first word has been found in the database, the same word may be also present in the sentence; therefore, the search has to be performed throughout the sentence by comparing every word up to the end of the sentence.

This method suffers from a disadvantage that it may take a lot of time to find a particular word.

In addition, there is a method of arraying words as in a dictionary and finding a desired word by hash index. In other words, a position of main sentence is found by defining a hash value corresponding to a word and positioning the value at a particular position to thereby narrow a search range.

This method suffers from a disadvantage that the hash has to be newly arrayed whenever a new word is added.

SUMMARY OF THE INVENTION

Technical problems

Therefore, the present invention has been made to solve the problems of prior art described above, and its object is to provide a system for providing a word search service based on message wherein data module is assigned to each word extracted from registered sentence data and thereafter input search word is broadcast to all data modules, a search result is provided from each data module in response to broadcasting, and then a word search result is provided to a user based on the provided search result.

Another object of the present invention is to provide a method for providing a word search service based on message wherein data module is assigned to each word extracted from registered sentence data and thereafter input search word is broadcast to all data modules, a search result is provided from each data module in response to broadcasting, and then a word search result is provided to a user based on the provided search result.

However, objects of the present invention is not limited by the above-mentioned objects, and yet another objects not mentioned may be clearly understood by those skilled in the art from the following description.

Solution to the Problem

To achieve the above-mentioned objects, a system for providing a word search service based on message according to an aspect of the present invention may include a database which is equipped with a plurality of data modules and registers sentence data and word extracted from the sentence data in each data module equipped to manage the sentence data and the word; and a service server which, if receiving a search word from a user terminal, broadcasts the received search word to all data modules and is provided with a search result from each of all data modules in response to broadcasting and thereafter provides the provided search result to the user terminal.

Preferably, if a sentence data is newly registered, the service server gives a sentence data number to the registered sentence data, and registers the given sentence data number as a key in a preset sentence storing site.

Preferably, the service server extracts words on a form basis from the registered sentence data, converts each extracted word into 64-bit hash code, creates a word listener data structure including the converted word, word size and sentence data number, and assigns the data module in the database to the created word listener data structure to store the data module therein.

Preferably, if the service server receives the search word from the user terminal, the server converts the received search word into the 64-bit hash code, and thereafter creates a transmission protocol structure including the converted search word, user ID and word size, and broadcasts the created transmission protocol structure to all data modules in the database.

Preferably, if each data module in the database receives the transmission protocol structure, the module extracts a top 64-bit data in the received transmission protocol structure and checks whether the extracted data coincides with its hash code, and if, as a result of checking, the extracted data coincides with its hash code, each data module creates a search result structure including the user ID, search word and sentence data number and transmits the created search result structure to queue in the service sever to register the search result structure therein.

Preferably, if, as a result of checking, the extracted data does not coincide with its hash code, each data module in the database does not create the search result structure.

A method for providing a word search service based on message according to another aspect of the present invention may include a step (a) where a service server registers sentence data and word extracted from the sentence data in each of a plurality of data modules equipped in a database to manage the sentence data and the word; and a step (b) where if receiving a search word from a user terminal, the service server broadcasts the received search word to all data modules and is provided with a search result from each of all data modules in response to broadcasting and thereafter provides the provided search result to the user terminal.

Preferably, in the step (a), if a sentence data is newly registered, the service server gives a sentence data number to the registered sentence data, and registers the given sentence data number as a key in a preset sentence storing site.

Preferably, in the step (a), the service server extracts words on a form basis from the registered sentence data, converts each extracted word into 64-bit hash code, creates a word listener data structure including the converted word, word size and sentence data number, and assigns the data module in the database to the created word listener data structure to store the data module therein.

Preferably, in the step (b), if the service server receives the search word from the user terminal, the server converts the received search word into the 64-bit hash code, and thereafter creates a transmission protocol structure including the converted search word, user ID and word size, and broadcasts the created transmission protocol structure to all data modules in the database.

Preferably, in the step (b), if each data module in the database receives the transmission protocol structure, the module extracts a top 64-bit data in the received transmission protocol structure and checks whether the extracted data coincides with its hash code, and if, as a result of checking, the extracted data coincides with its hash code, each data module creates a search result structure including the user ID, search word and sentence data number and transmits the created search result structure to queue in the service sever to register the search result structure therein.

Preferably, if, as a result of checking, the extracted data does not coincide with its hash code, each data module in the database does not create the search result structure.

Effects of the Invention

Thus, the present invention has an advantage that a word can be quickly searched by virtue of the fact that data module is assigned to each word extracted from registered sentence data and thereafter input search word is broadcast to all data modules, a search result is provided from each data module in response to broadcasting, and then a word search result is provided to a user based on the provided search result.

In addition, the present invention has another advantage that user's satisfaction can be enhanced as a word is quickly searched by assigning data module to each word extracted from registered sentence data.

BRIEF DESCRIPTION OF THE DRAWINGS

FIG. 1 is a view showing a system for providing a word search service according to an embodiment of the present invention;

FIG. 2 is a view showing detailed configuration of a service server according to an embodiment of the present invention;

FIG. 3 is a view for describing a principle of word search according to an embodiment of the present invention;

FIG. 4 is a view for describing a process of word addition according to an embodiment of the present invention; and FIG. 5 is a view showing a method for providing a word search service according to an embodiment of the present invention.

BEST MODES FOR CARRYING OUT THE INVENTION

In the following, a system and method for providing word search service based on message according to embodiments of the present invention. Parts necessary for understanding motion and operation according to the present invention will be mainly described in detail.

Furthermore, in describing elements of the present invention, an element having the same name may have different reference numerals depending on figures, and the same reference numeral may be assigned despite different figures. However, even in such a case, it is not meant that an element concerned has a different function depending on embodiments or has the same function in different embodiments. A function of each element should be determined based on description of each element in an embodiment concerned.

In particular, the present invention proposes a novel word search method in which data module is assigned to each word extracted from registered sentence data and thereafter input search word is broadcast to all data modules, a search result is provided from each data module in response to broadcasting, and then a word search result is provided to a user based on the provided search result.

FIG. 1 is a view showing a system for providing the word search service according to an embodiment of the present invention.

As illustrated in FIG. 1, the system for providing the word search service according to the present invention includes a user terminal (110), a service server (120) and database (130) etc.

A word to be searched is input to the user terminal (110) by the user, and the user terminal may request the search service for the input word from the service server (120) through wired or wireless communication.

Herein, the user terminal (110) is an electronic device allowing for the wireless communication or wired communication and may be a concept covering, for example, smart phone, tablet PC, PDA, laptop computer etc.

The service server (120) may give a sentence data number to the sentence data, register the sentence data number as a key, extract words on a form basis from the registered sentence data, and assign a data module to each extracted word and then store it.

If the service server (120) receives the search word from the user terminal (110), the server may broadcast the received search word to all data modules, and may be provided with a search result from each data module in response to broadcasting, and thereafter provide a word search result to a user based on the provided search result.

The database (130) may be equipped with a plurality of the data modules having preset sizes and store previously-assigned word in each data module equipped to manage the word.

For particular description, first, if the service server (120) receives the search word to be searched, the server converts the received search word into 64-bit hash code, and thereafter creates a transmission protocol structure including the converted search word, user ID, word size etc., and broadcasts the created transmission protocol structure to all data modules in the database (130).

At this time, the transmission protocol structure including the search word may be realized as in the following table 1.

TABLE 1

| Protocol structure | Bit size |
|---|---|
| word | 64 bit |
| user ID | 32 bit |
| word size | 32 bit |
| total | 128 bit |

If each data module in the database (130) receives the transmission protocol structure, the module extracts a top 64-bit data in the received transmission protocol structure and checks whether the extracted data coincides with its hash code.

If the extracted data coincides with its hash code, each data module in the database (130) creates a search result structure including the user ID, search word, sentence number etc. and registers the created search result structure in queue in the service sever.

At this time, the search result structure including the search result may be realized as in the following table 2.

TABLE 2

| Protocol structure | Bit size |
|---|---|
| user ID | 32 bit |
| word | 64 bit |
| sentence data number | 32 bit |
| total | 128 bit |

The service sever (120) provides the search result structure registered in the queue to the user terminal (110).

FIG. 2 is a view showing detailed configuration of the service server according to an embodiment of the present invention.

As illustrated in FIG. 2, the service server (120) according to the present invention includes a communication part (121), a registering unit (122), searching unit (123), a storing unit (124) and a processing unit (125).

The communication part (121) may transmit and receive various data through the user terminal (110) and wired or wireless communication. For example, the communication part (121) receives the search word from the user terminal (110) and transmits the search result for the received search word to the user terminal (110).

The registering unit (122) may give the sentence data number to the sentence data, register the sentence data number as a key, extract the word on a form basis from the registered sentence data, and assign the data module to each extracted word.

If the word searching unit (123) receives the search word from the user terminal (110), the word searching unit may broadcast the received search word to all data modules in the database (130) and may be provided with a search result from each data module in the database (130) in response to broadcasting.

The storing unit (124) may store the search result provided from each data module in the database (130). Herein, the storing unit (124) may be realized by the queue of first in first out manner.

The processing unit (125) may provide the search result stored in the storing unit (124) to the user terminal (110).

FIG. 3 is a view for describing a principle of word search according to an embodiment of the present invention.

As illustrated in FIG. 3, if the service server according to the present invention may broadcast the search word to all data modules in the database (130) and may be provided with the search result from each data module in the database in response to broadcasting.

In other words, if each data module (131) in the database (130) is called by the word concerned, the module gives notice of its position.

At this time, the data module provides the search result only when having the received search word.

FIG. 4 is a view for describing a process of word registration according to an embodiment of the present invention.

As illustrated in FIG. 4, if the sentence data is newly registered, the service server according to the present invention may give the sentence data number to the registered sentence data and register the sentence data number as a key (S410).

Next, the service server may extract the word on a form basis from the registered sentence data, convert each extracted word into the 64-bit hash code and create a word listener data structure including the converted word, word size, sentence data number etc. (S420).

At this time, the word listener data structure registering the word may be realized as in the following table 3.

TABLE 3

| Protocol structure | Bit size |
|---|---|
| word | 64 bit |
| word size | 32 bit |
| sentence data number | 32 bit |
| total | 128 bit |

Next, the service server may register the created word listener data structure in the area of a word lister, namely, in data module previously assigned to the sentence data in the database (S430).

FIG. 5 is a view showing a method for providing a word search service according to an embodiment of the present invention.

As illustrated in FIG. 5, the search word is input to the user terminal according to the present invention by the user (S510), and the user terminal may transmit the input search word and request the search service from the service server (S511).

Next, if the service server receives the search word, the server may broadcast the received search word to all data modules.

In other words, the service server converts the received search word into the 64-bit hash code and thereafter create the transmission protocol structure including the converted search word, user ID, word size etc. (S512) and broadcasts the created transmission protocol structure to all data modules in the database (130) (S513).

Next, each data module in the database may provide the service server with the search result indicating whether or not the received search word coincides with a word registered in the data module.

In other words, each data module in the database (130) checks whether the search word coincides with its hash code (S514), and if the search word coincides with its hash code as a result of checking, the data module creates the search result structure including the user ID, search word, sentence data number etc. (S515) and transmits and registers the created search result structure in the queue in the service sever (S516).

In contrast, if the search word does not coincide with its hash code as a result of the checking, each data module in the database (130) does not create the search result structure.

Next, the service server may provide the provided search result to the user terminal (110). In other words, the service server provides the user terminal with the search result structure stored in the queue (S517).

Meanwhile, the above-described embodiments of the present invention may be written into a program that can be run in a computer, and the program can be realized in universal digital computers running the program by the use of computer-readable recording medium. Example of the computer-readable recording medium includes a storage medium such as magnetic storage medium (for example, ROM, floppy disc, hard disc and the like) and optical reading medium (for example, CD-ROM, DVD and the like).

The above-described embodiments are only exemplary, and those skilled in the art will may make various modifications and changes without departing from the essential nature of the present invention. Therefore, the embodiments disclosed in the present invention is not intended to limit the technical concept of the present invention, rather is for the purpose of description, and the scope of technical concept of the present invention is not limited by such embodiments. The scope of claims of the present invention should be construed by the following claims, and all equivalent technical concepts should be construed to be included within the scope of claims of the present invention.

What is claimed is:

1. A system for providing a word search service based on message, comprising:
   a database which is equipped with a plurality of data modules and registers sentence data and word extracted from the sentence data in each data module equipped to manage the sentence data and the word; and
   a service server which,
   if a sentence data is newly registered, gives a sentence data number to the registered sentence data, and registers the given sentence data number as a key,
   extracts words on a form basis from the registered sentence data, converts each extracted word into 64-bit hash code, creates a word listener data structure including the converted word, word size and sentence data number, and assigns the data module in the database to the created word listener data structure to store the data module therein,
   wherein the service server, if receiving a search word from a user terminal, converts the received search word into the 64-bit hash code, and thereafter creates a transmission protocol structure including the converted search word, user ID and word size, and broadcasts the created transmission protocol structure to all the data modules in the database and is provided with a search result from the data modules in response to broadcasting and thereafter provides the provided search result to the user terminal, and
   wherein the data module, if receiving the transmission protocol structure, extracts a top 64-bit data in the received transmission protocol structure and checks whether the extracted data coincides with its hash code, if the extracted data coincides with its hash code, creates a search result structure including the user ID, search word, sentence number and registers the created search result structure in queue in the service server, and if, as a result of checking, the extracted data does not coincide with its hash code, does not create the search result structure.

2. A method for providing a word search service based on message, comprising:
   a step (a) where a service server registers sentence data and word extracted from the sentence data in each of a plurality of data modules equipped in a database to manage the sentence data and the word; and
   a step (b) where if receiving a search word from a user terminal, the service server broadcasts the received search word to all data modules and is provided with a search result from each of all data modules in response to broadcasting and thereafter provides the provided search result to the user terminal,
   wherein in the step (a), if a sentence data is newly registered, the service server gives a sentence data number to the registered sentence data, and registers the given sentence data number as a key,
   extracts words on a form basis from the registered sentence data, converts each extracted word into 64-bit hash code, creates a word listener data structure including the converted word, word size and sentence data number, and assigns the data module in the database to the created word listener data structure to store the data module therein,
   wherein in the step (b), if the service server receives the search word from the user terminal, the server converts the received search word into the 64-bit hash code, and thereafter creates a transmission protocol structure including the converted search word, user ID and word size, and broadcasts the created transmission protocol structure to all data modules in the database,
   wherein in the step (b), if the data module in the database receives the transmission protocol structure, the module extracts a top 64-bit data in the received transmission protocol structure and checks whether the extracted data coincides with its hash code, if, as a result of checking, the extracted data coincides with its hash code, each data module creates a search result structure including the user ID, search word and sentence data number and transmits the created search result structure to queue in the service sever to register the search result structure therein, and if, as a result of checking, the extracted data does not coincide with its hash code, each data module in the database does not create the search result structure.

* * * * *